(12) United States Patent
Hirano et al.

(10) Patent No.: US 7,591,643 B2
(45) Date of Patent: Sep. 22, 2009

(54) MOLD WITH EJECTOR PIN COOLING

(75) Inventors: Toru Hirano, Seiro (JP); Yasuhiro Goto, Nakajo (JP)

(73) Assignee: Hitachi Industrial Equipment Systems Co., Ltd., Chiba (JP)

( * ) Notice: Subject to any disclaimer, the term of this patent is extended or adjusted under 35 U.S.C. 154(b) by 786 days.

(21) Appl. No.: 11/063,596

(22) Filed: Feb. 24, 2005

(65) Prior Publication Data

US 2006/0113709 A1    Jun. 1, 2006

(30) Foreign Application Priority Data

Nov. 26, 2004    (JP)    ............................. 2004-341377

(51) Int. Cl.
    *B29C 45/40* (2006.01)
    *B29C 45/73* (2006.01)

(52) U.S. Cl. .................. 425/556; 425/436 R; 425/444; 425/577

(58) Field of Classification Search ................. 425/552, 425/556, 577, 444, 436 R
See application file for complete search history.

(56) References Cited

U.S. PATENT DOCUMENTS

| 3,424,089 | A | | 1/1969 | Humpherson |
| 4,275,864 | A | * | 6/1981 | Richards ...................... 249/79 |
| 5,582,788 | A | * | 12/1996 | Collette et al. ............ 264/297.2 |
| 6,042,354 | A | * | 3/2000 | Loren .......................... 425/130 |
| 6,062,842 | A | * | 5/2000 | Murphy ........................ 425/130 |
| 2003/0006532 | A1 | * | 1/2003 | Graham et al. ............... 264/318 |

FOREIGN PATENT DOCUMENTS

| DE | 25 40 519 | 3/1977 |
| DE | 100 05 300 | 10/2001 |
| DE | 103 29 494 | 7/2004 |
| FR | 2 649 640 | 1/1991 |
| JP | 55-53542 | 4/1980 |
| JP | 59-136229 | 8/1984 |
| JP | 5-9917 U | 2/1993 |
| JP | 05-329892 | 12/1993 |
| JP | 7-47574 | 2/1995 |
| JP | 9-39043 | 2/1997 |
| JP | 9-39043 A | 2/1997 |
| JP | 9-76236 A | 3/1997 |
| JP | 09-267364 | 10/1997 |

OTHER PUBLICATIONS

Von Heuel, Achtfach-Heißkanal-Spritzgießwerkzeug mit zweistufiger Entformung für Verschlußstopfen aus PE, vol. 74, No. 12. Dec. 1984, pp. 716-718, XP-001173832.

(Continued)

*Primary Examiner*—Yogendra Gupta
*Assistant Examiner*—Emmanuel S Luk
(74) *Attorney, Agent, or Firm*—Antonelli, Terry, Stout & Kraus, LLP.

(57) ABSTRACT

In a molding method and a mold therefore, a fluid flows through an ejector pin including a front end surface movable with respect to the mold to release or remove from the mold at least a part of a product made from a melted material so that the front end surface of the ejector pin movable with respect to the mold is cooled by the fluid.

7 Claims, 4 Drawing Sheets

OTHER PUBLICATIONS

Achtfach-Heiβkanal-Spritzgieβwerkzeug mit zweistufiger Entformung fur Verschluβstopfen aus PE, Vong Huel, vol. 4, No. 12, Dec. 1984, pp. 716-718.

Patent Abstracts of Japan, vol. 1997, No. 6, JP 09-39043, Feb. 10, 1997.

Patent Abstracts of Japan, vol. 1995, No. 5, 07-47574, Feb. 21, 1995.

* cited by examiner

MOLD WITH EJECTOR PIN COOLING

INCORPORATION BY REFERENCE

The present application claims priority from Japanese application JP2004-341377 filed on Nov. 26, 2004, the content of which is hereby incorporated by reference into this application.

BACKGROUND OF THE INVENTION

The present invention relates to a mold and molding method for forming a product from a melted material.

In a prior art mold and molding method as disclosed by JP-A-9-267364, a stationary cooling pin in which a coolant is circulated and which is fixed to a movable side of the mold is surrounded by an ejector pin movable with respect to the movable side of the mold to remove a product or cured resin from the movable side of the mold.

BRIEF SUMMARY OF THE INVENTION

An object of the present invention is to provide a mold and molding method for forming a product from a melted material, in which the melted material is effectively cooled.

In a mold for forming a product from a melted material, comprising, first and second mold parts movable with respect to each other to contact each other in such a manner that a cavity is formed therebetween so that the melted material is capable of being inserted into the cavity and being subsequently solidified in the cavity to form the product, and to be separated from each other in such a manner that the product is capable of being taken out of the cavity, wherein one of the first and second mold parts has a material path for injecting the melted material into the cavity in such a manner that the melted material oriented along an injecting axis (or direction) flows into (reaches) the cavity, the other one of the first and second mold parts has a surface capable of defining a part of the cavity when the melted material is injected into the cavity, and an ejector pin including a front end surface capable of defining another part of the cavity when the melted material is injected into the cavity, wherein the ejector pin is movable with respect to the surface so that at least a part of the product is released (or removed) (by the ejector pin) from the other one of the first and second mold parts (when only a part of the product contacting the front end surface is released or removed by the ejector pin from the other one of the first and second mold parts, it is sometimes preferable or desired for the part of the product to be eliminated from a final product such as an optical recording disk), according to the invention, since the movable ejector pin has a fluid path (therein) for enabling a fluid to pass through the ejector pin so that the front end surface is capable of being cooled by the fluid, the part of the product contacting the front end surface to be moved by the movable ejector pin so that the at least a part of the product is released or removed by the ejector pin from the other one of the first and second mold parts, is effectively cooled through the whole of the front end surface, so that a start of the movement of the ejector pin for releasing or removing the at least a part of the product from the other one of the first and second mold parts is hastened even when a volume of the part of the product contacting the front end surface is great.

When the injecting axis crosses the front end surface, the part of the product contacting the front end surface is formed in a sprue lock so that the volume of the part of the product contacting the front end surface becomes necessarily great. Therefore, it becomes more important for hastening the start of the movement of the ejector pin that the movable ejector pin has the fluid path (therein) for enabling the fluid to pass through the ejector pin so that the front end surface is capable of being cooled by the fluid.

If the fluid is a gaseous matter, an adiabatic expansion of the fluid can be utilized for cooling the ejector pin.

If the ejector pin has a longitudinal outer peripheral surface expanding in a longitudinal direction of the ejector pin (that is, in a movable direction in which the ejector pin is movable with respect to the surface), and the fluid path opens to an outer environment of the ejector pin (that is, an outside of the ejector pin as seen in the movable direction) at a part of the longitudinal outer peripheral surface to enable (preferably, discharge) the fluid to flow between (preferably, from) an inside of the ejector pin and (preferably, to) the outer environment of the ejector pin at the part of the longitudinal outer peripheral surface, the fluid is prevented from being heated by or in the ejector pin unnecessarily and the ejector pin is prevented from being heated by the fluid, so that the ejector pin is effectively cooled. If the fluid path has a portion distant from the part of the longitudinal outer peripheral surface in a flow of the fluid, and a distance between the front end surface and the portion in a movable direction in which the ejector pin is movable with respect to the surface is smaller than a distance between the front end surface and the part of the longitudinal outer peripheral surface in the movable direction, a slide area of the longitudinal outer peripheral surface of the ejector pin to be contacted with the other one of the first and second mold parts so that the ejector pin is movably supported by the other one of the first and second mold parts may be arranged in the vicinity of the front end surface while a distance between the fluid in the fluid path and the front end surface in the movable direction of the ejector pin is kept as small as possible. If the other one of the first and second mold parts has a space being arranged at the outside of the ejector pin and fluidly connected to the fluid path at the part of the longitudinal outer peripheral surface to enable the fluid to flow in the space while contacting the longitudinal outer peripheral surface (in a direction backing away from the front end surface), a length and area in which the fluid contacts the ejector pin can be great to increase the efficiency in cooling the ejector pin. If the space extends to surround (the longitudinal outer peripheral surface of) the ejector pin as seen in a movable direction in which the ejector pin is movable with respect to the surface, the length and area in which the fluid contacts the ejector pin can be further increased, and a distribution in temperature of the ejector pin in a radial and/or circumferential direction of the ejector pin is made constant.

It is preferable for effectively cooling the product contacting the front end surface that the fluid is capable of flowing through the fluid path while at least one of the melted material and the product contacts the front end surface. It is preferable for rapidly cooling the product contacting the front end surface just after the melted material reaches the front end surface that the fluid is capable of flowing through the fluid path after the product is removed from the front end surface, that is, before the melted material reaches the front end surface. The front end surface may expand in a direction perpendicular to a movable direction in which the ejector pin is movable with respect to the surface.

If the fluid is capable of flowing out from the ejector pin at the part of the longitudinal outer peripheral surface into the space, an adiabatic expansion of the fluid of gaseous matter is utilized to cool the ejector pin.

In a method for forming a product from a melted material, comprising the steps of moving first and second mold parts with respect to each other to contact each other so that a cavity is formed therebetween, injecting the melted material into the cavity, solidifying the melted material to form the product, moving the first and second mold parts with respect to each other to be separated from each other so that the product is capable of being taken out of the cavity, and moving an ejector pin including a front end surface defining a part of the cavity with respect to a surface of one of the first and second mold parts defining another part of the cavity in such a manner that at least a part of the product is released (or removed) (by the ejector pin) from the one of the first and second mold parts (when only a part of the product contacting the front end surface is released or removed by the ejector pin from the one of the first and second mold parts, it is sometimes desired or preferable for the part of the product to be eliminated from a final product such as an optical recording disk), according to the invention, since a fluid passes through the ejector pin so that the front end surface is cooled by the fluid during the step of solidifying the melted material, the part of the product contacting the front end surface to be moved by the movable ejector pin so that the at least a part of the product is released or removed by the ejector pin from the other one of the first and second mold parts, is effectively cooled through the whole of the front end surface, so that a start of the movement of the ejector pin for releasing or removing the at least a part of the product from the other one of the first and second mold parts is hastened even when a volume of the part of the product contacting the front end surface is great.

If an injecting axis along which the melted material reaching (flowing into) the cavity is oriented crosses the front end surface, the part of the product contacting the front end surface is formed in a sprue lock so that the volume of the part of the product contacting the front end surface becomes necessarily great. Therefore, it becomes more important for hastening the start of the movement of the ejector pin that the movable ejector pin has the fluid path (therein) for enabling the fluid to pass through the ejector pin so that the front end surface is capable of being cooled by the fluid.

If the fluid is a gaseous matter, the adiabatic expansion of the fluid can be utilized for cooling the ejector pin.

If the fluid flows between an inside of the ejector pin and an outside of the ejector pin (that is, an outer environment of the ejector pin as seen in a movable direction in which the ejector pin is movable) at a part of a longitudinal outer peripheral surface of the ejector pin expanding in a longitudinal direction of the ejector pin (parallel to the movable direction), the fluid is prevented from being heated by or in the ejector pin unnecessarily and the ejector pin is prevented from being heated by the fluid, so that the ejector pin is effectively cooled. If the fluid flows to a portion distant from the part of the longitudinal outer peripheral surface in a flow of the fluid, and a distance between the front end surface and the portion in a movable direction in which the ejector pin is movable with respect to the surface is smaller than a distance between the front end surface and the part of the longitudinal outer peripheral surface in the movable direction, a slide area of the longitudinal outer peripheral surface of the ejector pin to be contacted with the other one of the first and second mold parts so that the ejector pin is movably supported by the other one of the first and second mold parts may be arranged in the vicinity of the front end surface while a distance between the fluid in the fluid path and the front end surface in the movable direction of the ejector pin is kept as small as possible. If the fluid flows in a space arranged at an outside of the ejector pin and fluidly connected to the fluid path at the part of the longitudinal outer peripheral surface while contacting the longitudinal outer peripheral surface (in a direction backing away from the front end surface), a length and area in which the fluid contacts the ejector pin can be great to increase the efficiency in cooling the ejector pin. If the fluid flows in the space to surround (the longitudinal outer peripheral surface of) the ejector pin as seen in a movable direction in which the ejector pin is movable with respect to the surface, the length and area in which the fluid contacts the ejector pin can be further increased, and a distribution in temperature of the ejector pin in a radial and/or circumferential direction of the ejector pin is made constant.

It is preferable for effectively cooling the product contacting the front end surface that the fluid flows through the fluid path while at least one of the melted material and the product contacts the front end surface. It is preferable for rapidly cooling the product contacting the front end surface just after the melted material reaches the front end surface that the fluid flows through the fluid path after the product is removed from the front end surface, that is, before the melted material reaches the front end surface.

If the fluid flows out from the ejector pin at the part of the longitudinal outer peripheral surface into the space, the adiabatic expansion of the fluid of gaseous matter is utilized to cool the ejector pin.

Other objects, features and advantages of the invention will become apparent from the following description of the embodiments of the invention taken in conjunction with the accompanying drawings.

DETAILED DESCRIPTION OF THE INVENTION

An embodiment of the invention is explained with using the drawings.

Figure 1:
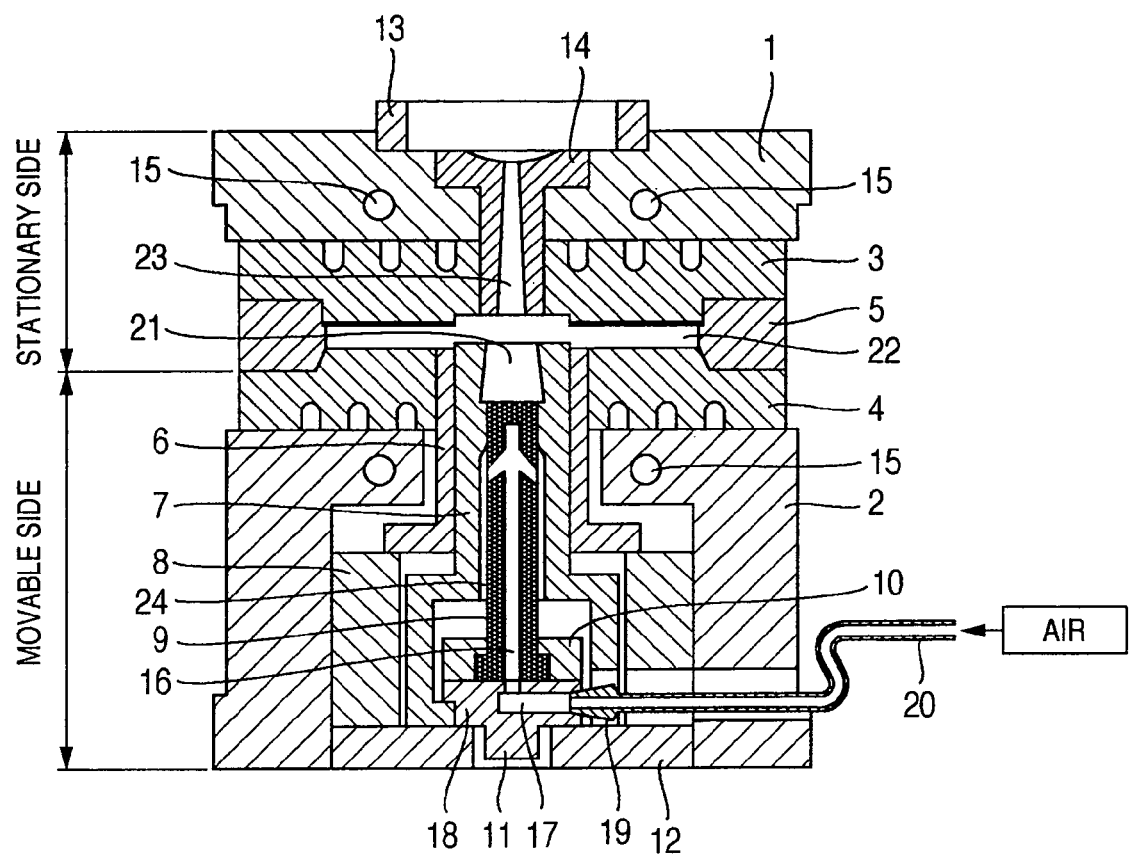
FIG. 1 is a cross sectional view showing a mold of the invention.

FIG. 1 shows a structure of a mold for an optical disk or the like, in which a cooling operation of the invention is utilized.

In FIG. 1, a stationary side mold plate 1 is a main part forming a body of a stationary side mold, and a stationary mirror surface plate 3, a spool bush 14 and so forth are attached to the stationary side mold plate 1. Further, the stationary side mold plate 1 includes a coolant circuit 15 for controlling a temperature of the mold. A movable side mold plate 2 is a main part forming a body of a movable side mold, and a movable side mirror surface plate 4, an ejector mechanism and so forth are attached to the movable side mold plate 2. The movable side mold plate 2 includes the coolant circuit 15 for controlling the temperature of the mold.

During molding, a melted resin is injected into a molding portion 22 and cooled to be solidified to form a disk-shape, the stationary mirror surface plate 3 forms a main surface of the disk, and the movable side mirror surface plate 4 forms a reverse surface thereof. Further, an outer peripheral ring 5 forms an outer peripheral side surface of the disk, and these three members form a disk forming portion 22. The mirror surface plates includes the coolant circuit for keeping a mold temperature at an appropriate degree.

An ejector sleeve 6 is a tubular member for taking the disk formed and solidified in the disk forming portion 22 out of the disk forming portion 22 with a protruding of the ejector sleeve 6. A combination of the forward protruding and a backward withdrawal for next molding is repeated at every molding of one disk.

A cut punch 7 is a member for forming a center hole (φ15 mm) of the disk. This member is arranged within the ejector sleeve. When the melted resin is cooled to be solidified in the molding portion 22, the cut punch moves forward to form the hole. A cylinder 8 includes an ejector mechanism such as an ejector sleeve 6, the cut punch 7 and so forth.

An ejector pin 9 includes an axial air hole 16 into which a cooling air is introduced, and a hole extending radially outward to discharge the cooling air in the vicinity of an end of the pin. The ejector pin 9 moves forward to remove the resin filling a sprue lock 21 from the cut punch 7.

A first ejector plate 10 and a second ejector plate 11 hold the ejector pin 9 to push out the resin cured in the sprue lock 21 of the curt punch 7. A flange of the ejector pin 9 is clamped by the first and second ejector plates 10 and 11. The second ejector plate 11 has an air hole 17 for introducing the air from an air supply into the air hole 16 of the ejector pin 9, and an O-ring in a groove to prevent a leakage of the air.

A pressing plate 12 is a member for pressing ejector mechanism members such as the cut punch 7, the ejector sleeve 6 and so forth incorporated in the movable side mold plate 4. A locating ring 13 is a member for positioning between the mold and an injection machine so that a nozzle of the injection machine for injecting the melted resin is aligned with a sprue 23 of the mold. A sprue bush 14 is a member for guiding the melted resin injected by the nozzle of the injection machine to the molding portion 22 of the mold. A coolant hole 15 is formed in the mold to circulate a cooling medium so that the temperature of the mold is kept at an appropriate temperature suitable for molding of the resin.

The air hole 16 is arranged in the ejector pin 9 to enable the cooling air therethrough. This hole extends axially in the ejector pin 9 and the hole for discharging the air radially outwardly is arranged in the vicinity of the end of the ejector pin. The air hole 17 is a hole for introducing the air from the air supply on the second ejector plate 11 into the air hole 16 in the ejector pin 9. The O-ring 18 prevents the air from leaking at a joint between members when the cooling air is introduced into the air hole 16 in the ejector pin 9 through the air hole in the second ejector plate 11 from the air supply. A joint 19 and an air tube 20 are used to pass the air from the air supply through the air hole 17 in the second ejector plate 11. The air tube 2 and the air hole 17 of the second ejector plate 11 are connected by a joint attached to the second ejector plate 11. 21 denotes the sprue lock, 23 denotes the sprue, and 24 denotes an air discharge space.

Figure 2:
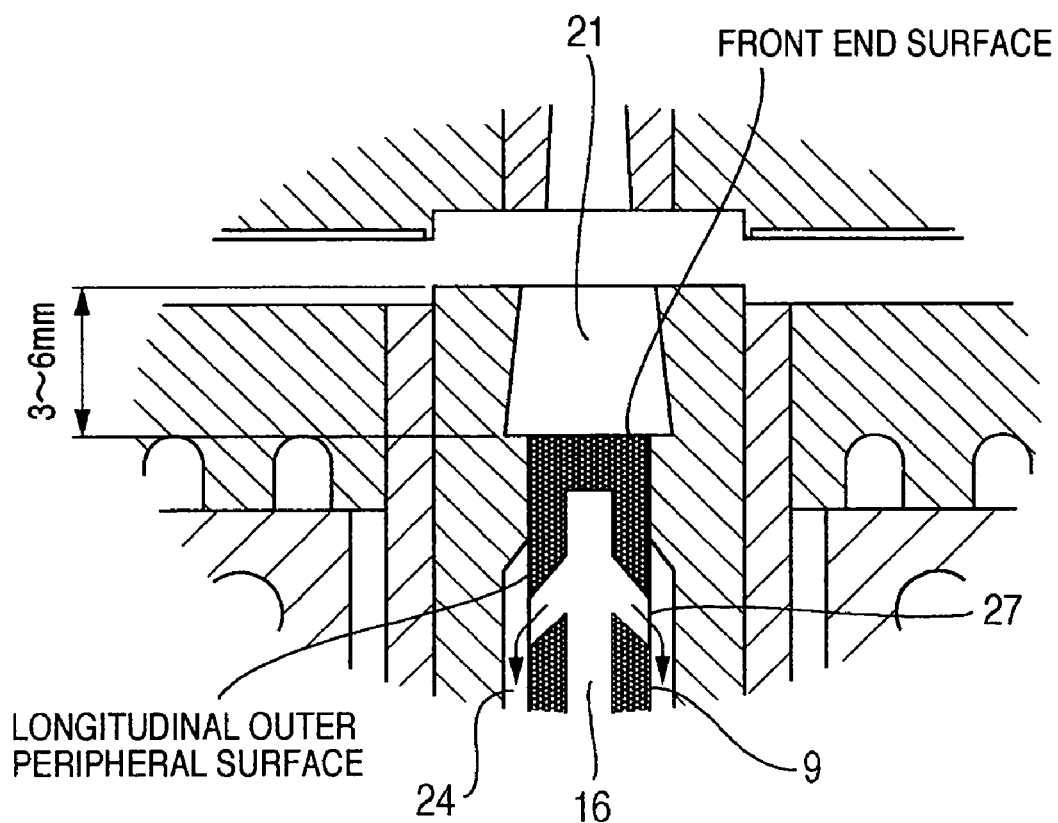
FIG. 2 is an enlarged view showing an ejector pin for the mold of the invention.

FIG. 2 is an enlarged partial view of the ejector pin of the invention as shown in FIG. 1. The ejector pin 9 has the air hole 16 terminating axially and the hole extending radially outward from the sir hole 16 to discharge the air at the vicinity of the terminating end of the air hole 16. The air discharged from the ejector pin 9 flows in the discharge space 24 surrounding the ejector pin 9 to be discharged to the outer atmosphere. A front end of the ejector pin 9 in the vicinity of the terminating end of the air hole 16 contacts the sprue lock 21 to be effectively cooled. A relief path 24 surrounds a part of the longitudinal outer peripheral surface of the ejector pin 9 (other than another part thereof to be supported by the plate 2 or 4 in the vicinity of the front end of the ejector pin 9) and extends to the outside of the mold to discharge the air from the inside of the ejector pin 9 to the outside of the mold.

Figure 3:
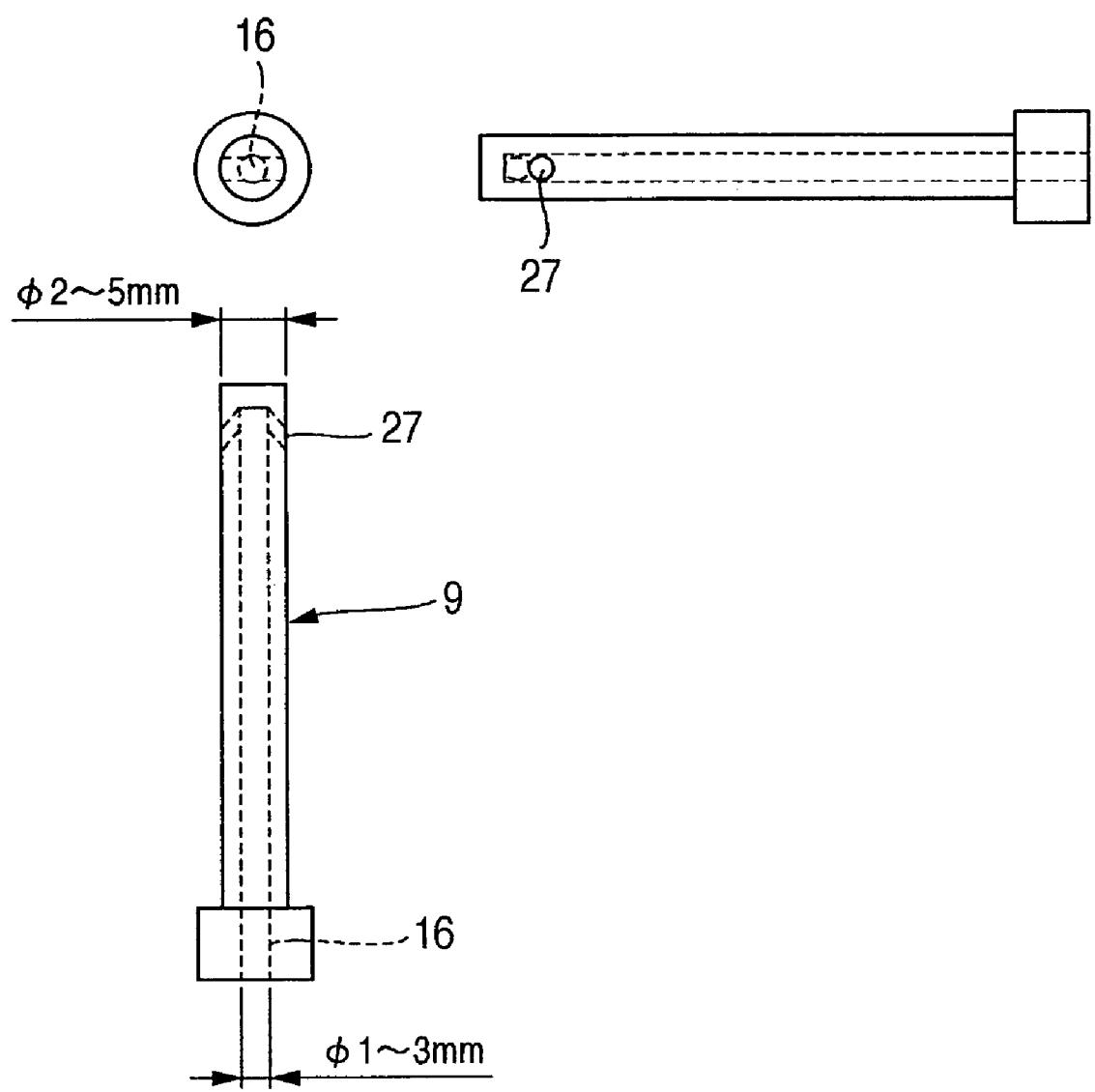
FIG. 3 is a combination of front view, side view and horizontal view of the ejector pin.

FIG. 3 shows the holes for discharging the air through an outer periphery of the ejector pin 9 from the air hole 16 thereof.

In FIG. 3, an outer diameter of the ejector pin of the mold for molding the disk is about φ2-5 mm, and a diameter of the air hole 16 is about φ1-3 mm.

The holes 27 for discharging the air through the outer periphery of the ejector pin is 2 while being arranged symmetrically in FIG. 3, and the orientations of the holes 27 form acute angle with respect to the air hole 16 to decrease a resistance for circulation of the air to be discharged.

A member of the hole 27 is 2 in FIG. 3, but may be 4 and so forth.

Figure 4:
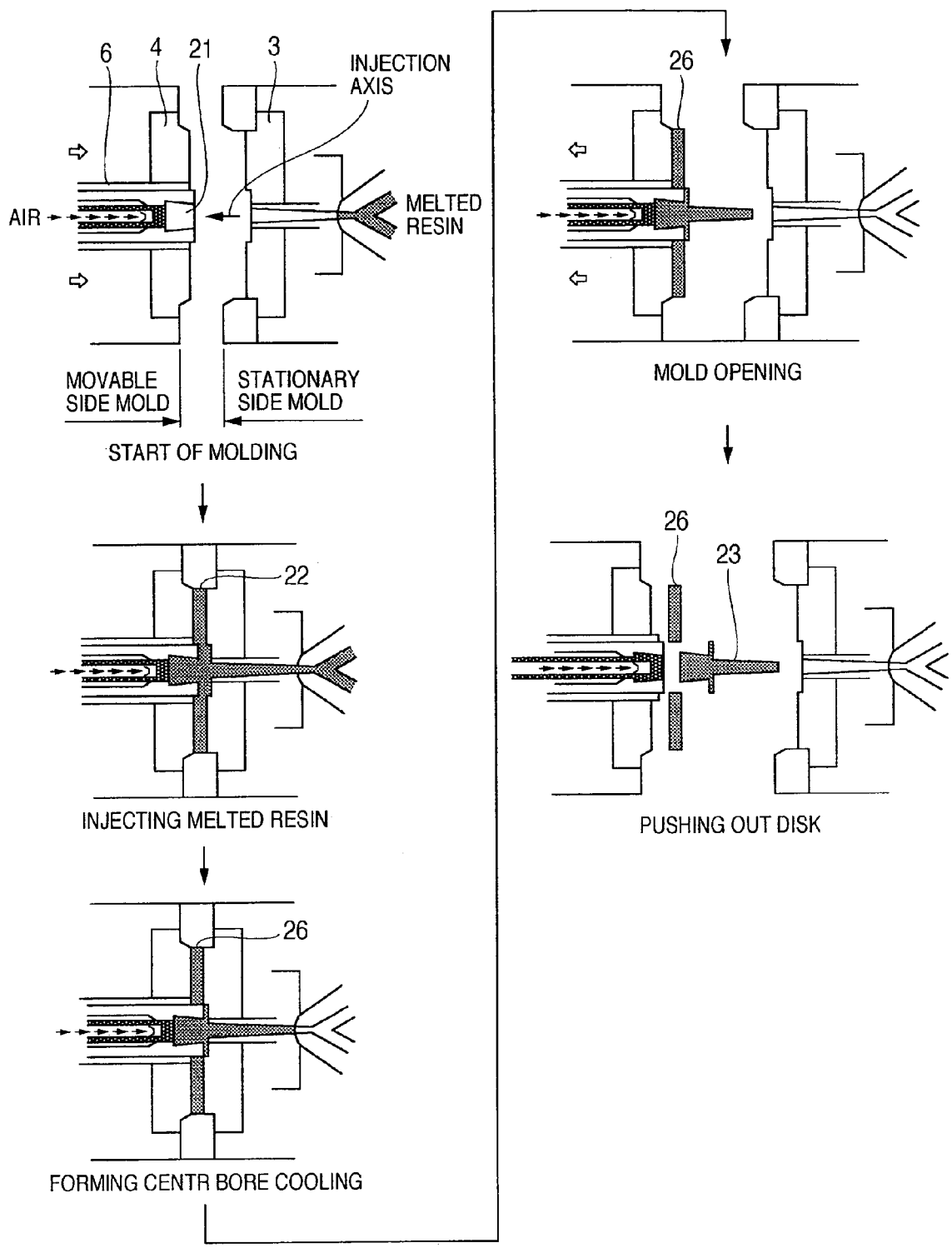
FIG. 4 is a flow chart showing a process of forming a product from a melted material.

FIG. 4 shows a process for producing an optical disk of polycarbonate resin with φ120 mm.

In a step of clamping the mold, the movable side mold (lower side in FIG. 1) is moved forward to contact the stationary side mold to be clamped each other. The ejector pin 9 pushing out the sprue lock 21 has the axial air hole 16 for passing the air at a radial center so that the cooling air flows to cool the front end of the ejector pin during the molding.

In a step of injecting the melted resin after the clamping the mold, a melted polycarbonate resin is injected into the mold from the nozzle of the injection machine through the sprue bush 14, so that the molding portion 22 formed by the stationary side mirror surface plate 3 and the movable side mirror surface plate 4 is filled with the melted polycarbonate resin.

After the molding portion 22 is filled with the melted resin, the resin in the molding portion 22 is cooled by the cooling water flowing through the cooling hole 15 of the mold so that the melted resin is solidified. During the solidifying, the central hole (φ15 mm) of the disk is formed. In this step, a time period for solidifying the resin in the sprue lock 21 is longer than a time period for solidifying a ring portion of the disk, so that a cycle time period of the molding is determined by the time period for solidifying the resin in the sprue lock 21. Therefore, the cooling air passes through the hole 16 in the ejector pin 9 to cool the front end of the ejector pin 9 so that the resin in the sprue lock 21 is cooled, whereby the time period for the solidifying is decreased to decreased the cycle time period of the molding.

In a step of opening the mold by moving backward the movable side mold, a product of disk 26 is held by the movable side mold on which the sprue lock 21 is arranged.

Subsequently, the resin in the sprue lock 21 is pushed out therefrom by the ejector pin 9, and the product of disk 26 is pushed out by the ejector sleeve 6 from the movable side mold.

Thereafter, the ejector pin and the ejector sleeve return respective initial positions to perform the step of clamping the mold, and the molding is repeated.

By cooling the resin in the sprue lock by the front surface of the ejector pin, the cycle time period of the molding is decreased to improve a production efficiency.

It should be further understood by those skilled in the art that although the foregoing description has been made on embodiments of the invention, the invention is not limited thereto and various changes and modifications may be made without departing from the spirit of the invention and the scope of the appended claims.

The invention claimed is:

1. A mold for forming a product from a melted material, comprising, first and second mold parts movable with respect to each other to contact each other in such a manner that a cavity is formed therebetween so that the melted material is capable of being inserted into the cavity and being subsequently solidified in the cavity to form the product, and to be separated from each other in such a manner that the product is capable of being taken out of the cavity, wherein one of the first and second mold parts has a material path for injecting the melted material into the cavity in such a manner that the melted material oriented along an injecting axis flows into the cavity, the other one of the first and second mold parts has a surface capable of defining a part of the cavity when the melted material is injected into the cavity, and an ejector pin including a front end surface capable of defining another part of the cavity when the melted material is injected into the cavity, wherein the ejector pin is movable with respect to the surface of the other one of the first and second mold parts between a retracted position and a projected position so that at least a part of the product is released from the other one of the first and second mold parts, wherein the ejector pin has a fluid path for enabling a gaseous fluid to pass through the ejector pin so that the front end surface is capable of being cooled by the gaseous fluid and a longitudinal outer peripheral surface extending in a longitudinal direction of the ejector pin, and the fluid path opens to an outer environment of the ejector pin at only a part of the longitudinal outer peripheral surface to allow the gaseous fluid to be discharged from an inside of the ejector pin to the outer environment of the ejector pin at only the part of the longitudinal outer peripheral surface when the ejector pin is positioned at its retracted position, and the part of the longitudinally outer peripheral surface is closely covered by the other one of the first and second mold parts to restrain the gaseous fluid from being discharged from the inside of the ejector in to the outer environment of the ejector pin when the ejector pin is positioned at its projected position to push out the product from the other one of the first and second parts.

2. A mold according to claim 1, wherein the injecting axis crosses the front end surface.

3. A mold according to claim 1, wherein the fluid path has a portion distant from the part of the longitudinal outer peripheral surface in a flow of the fluid, and a distance between the front end surface and the portion in a movable direction in which the ejector pin is movable with respect to the surface is smaller than a distance between the front end surface and the part of the longitudinal outer peripheral surface in the movable direction.

4. A mold according to claim 1, wherein the other one of the first and second mold parts has a space being arranged at an outside of the ejector pin and fluidly connected to the fluid path at the part of the longitudinal outer peripheral surface to enable the fluid to flow in the space while contacting the longitudinal outer peripheral surface.

5. A mold according to claim 4, wherein the space extends to surround the longitudinal outer peripheral surface as seen in a movable direction in which the ejector pin is movable with respect to the surface.

6. A mold according to claim 1, wherein the fluid is capable of flowing through the fluid path while at least one of the melted material and the product contacts the front end surface.

7. A mold according to claim 1, wherein the fluid is capable of flowing through the fluid path after the product is removed from the surface.

* * * * *